(12) United States Patent
Abatzoglou et al.

(10) Patent No.: US 7,289,060 B1
(45) Date of Patent: Oct. 30, 2007

(54) SUPER HIGH RANGE RESOLUTION AMPLITUDE AND RANGE PRINCIPAL SCATTERER (SHARP) CLASSIFIER

(75) Inventors: Theagenis J. Abatzoglou, Huntington Beach, CA (US); Raquel E. Maderazo, Marina del Rey, CA (US); Jessica E. Swanson, El Segundo, CA (US); Frederick A. Dominski, Hermosa Beach, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/439,584

(22) Filed: May 24, 2006

(51) Int. Cl.
 G01S 7/285 (2006.01)
 G01S 13/00 (2006.01)
 G01S 13/90 (2006.01)
(52) U.S. Cl. .................. 342/90; 342/25 R; 342/89; 342/175; 342/189; 342/195; 342/196
(58) Field of Classification Search .... 342/25 R–25 F, 342/82–103, 118, 134–145, 175, 189–197
See application file for complete search history.

(56) References Cited

U.S. PATENT DOCUMENTS

| | | | |
|---|---|---|---|
| 6,337,654 B1 * | 1/2002 | Richardson et al. | 342/90 |
| 6,437,728 B1 * | 8/2002 | Richardson et al. | 342/90 |
| 6,801,155 B2 * | 10/2004 | Jahangir et al. | 342/90 |

* cited by examiner

Primary Examiner—Bernarr E. Gregory
(74) Attorney, Agent, or Firm—Leonard A. Alkov

(57) ABSTRACT

A radar classifies an unknown target illuminated with a large bandwidth pulse. The large bandwidth pulse may be algorithmically synthesized. The target reflects the large bandwidth pulse to form a return. The return is digitized into digital samples at range bin intervals. A computer extracts unknown range and amplitude pairs descriptive of the unknown target from the digital samples. Some range and amplitude pairs are located within one range bin interval. Principle scatterers are extracted from the unknown range and amplitude pairs using Modified Forward backward linear Prediction to form an unknown feature vector for the target. A plurality of pre-stored, known feature vectors containing known range and amplitude pairs are retrieved from the computer. The known range and amplitude pairs are descriptive of known targets, and are grouped in clusters having least dispersion for each of the known targets. The computer associates, for the principal scatterers, the unknown feature vector descriptive of the unknown target with each of the known feature vectors. The target is classified by using highest a posteriori conditional probability density obtained from comparing the known feature vectors with the unknown feature vector. The principal scatterers descriptive of the unknown, target are estimated using a Modified Forward Backward Linear Prediction. The Modified Forward Backward Linear Prediction also estimates range of the principal scatterers forming the unknown target. The principal scatterers are tested for decaying modes. The Modified Forward Backward Linear Prediction estimates are evaluated using Cramer Reo Bound computation for robustness.

12 Claims, 3 Drawing Sheets

SUPER HIGH RANGE RESOLUTION AMPLITUDE AND RANGE PRINCIPAL SCATTERER (SHARP) CLASSIFIER

BACKGROUND OF THE INVENTION

This invention was made with Government support under Contract No. F19628-00-C-0100 awarded by the Department of the Air Force. The Government has certain rights in this invention.

FIELD OF INVENTION

This invention is in the field of radar target classification using target range profiles.

DESCRIPTION OF THE RELATED ART

A desirable function of radar systems is to classify target type(s) it detects leading to identification of the target. A class of radar target classification methods generally use the target's scatterer position in a plurality of range bins to construct a range profile of the target. In some cases, where sufficient range and azimuth scatterer samples are available, Synthetic Aperture Radar (SAR) and/or Inverse Synthetic Aperture Radar (ISAR) target imaging methods can be applied to arrive at a target scatterer decomposition in range and cross-range. This decomposition, when used with a target classifier, may identify the target.

However, SAR and ISAR classification methods of the prior art require a long dwell time on the target, typically in the order of seconds, and impose a substantial computational load on a host computer while encountering relatively high classification errors. Furthermore, radar resolution limitations can reduce the ability of the processor to separate significant scatterers within the same resolution cell, leading to scatterer scintillation. These limitations sometimes preclude real time classification of detected targets thus reducing radar target identification utility and reliability.

SUMMARY OF THE INVENTION

Above limitations are reduced by a radar for classifying an unknown target illuminated with a large bandwidth pulse. The large bandwidth pulse may be algorithmically synthesized. The unknown target reflects the large bandwidth pulse to form a return received by the radar. The radar comprises an analog to digital converter for converting the return from the unknown target into digital samples at range bin intervals. A computer is provided for a) Extracting a plurality of unknown range and amplitude pairs descriptive of the unknown target from the digital samples. Some of the plurality of unknown range and amplitude pairs are located within one range bin interval;

b) Extracting principal scatterers from the unknown range and amplitude pairs;

c) Forming an unknown feature vector for the unknown target using unknown range and amplitude pairs associated with the principal scatterers.

d) Retrieving a plurality of known feature vectors containing known range and amplitude pairs stored in the computer. The known range and amplitude pairs are descriptive of known targets, and are grouped in clusters having least dispersion for each of the known targets;

e) Associating, for the principal scatterers, the unknown feature vector descriptive of the unknown target with said plurality of known feature vectors; and f) Classifying the unknown target using highest a posteriori conditional probability density obtained from comparing the known feature vectors with the unknown feature vector.

The principal scatterers descriptive of the unknown target are estimated using a Modified Forward Backward Linear Prediction thereby reducing computation load by limiting the overall number of range amplitude pairs to be analyzed.

The Modified Forward Backward Linear Prediction also estimates range of the principal scatterers forming the unknown target.

The principal scatterers are tested for decaying modes.

The Modified Forward Backward Linear Prediction estimates are evaluated using Cramer Reo Bound computation for robustness.

Unknown target range and amplitude pairs located within the same range bin are extracted using a matched filter correlator followed by a Fourier Transform and demodulation of the transmitter and receiver waveform.

DETAILED DESCRIPTION OF THE INVENTION

Figure 1:
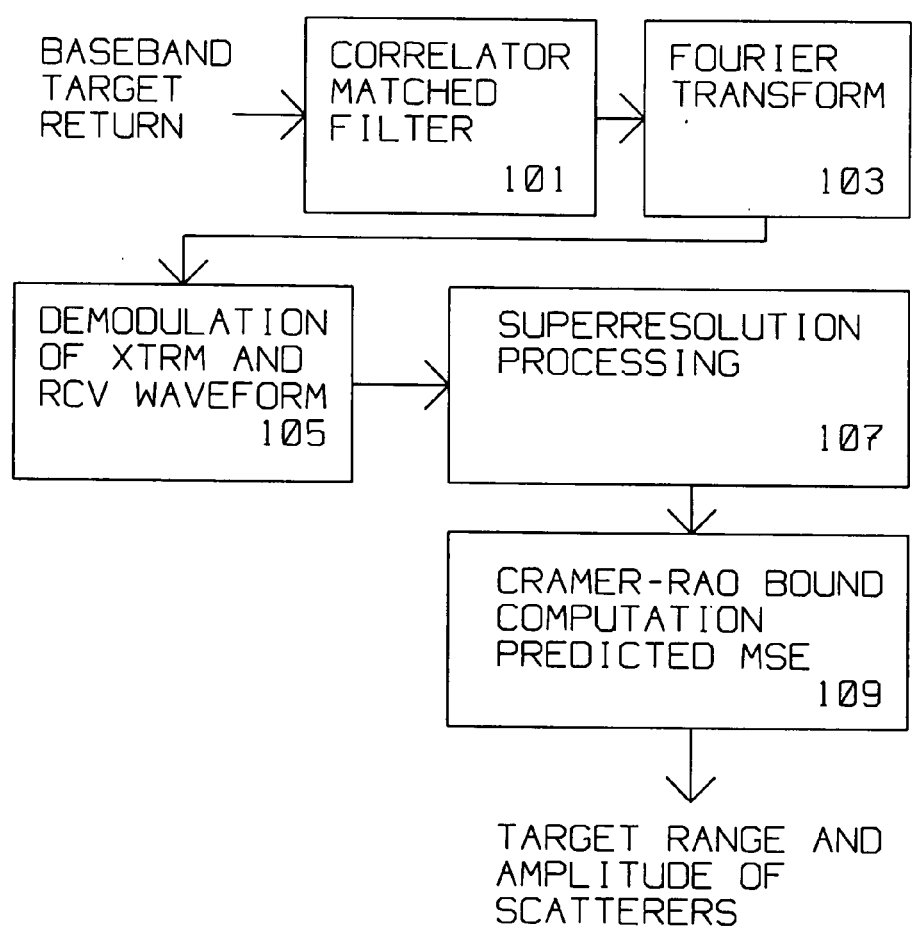
FIG. 1 is a flow diagram of the radar signal processing used for target classification.

The present disclosure describes a High Range Resolution (HHR) radar and method for target feature extraction used for radar target classification.

Illuminating a radar target to be classified with a large bandwidth (BW) radar waveform yields a distribution of target radar cross section (RCS) over range after pulse compression. This is the target range profile. After demodulating the transmitted waveform, typically pulse compression or range matched filter operation is computed using a Fourier transform. The range resolution after the pulse compression is given by $$1.5 \frac{c}{(2BW)}$$

where c is the speed of light in air and

BW is the radar bandwidth.

The factor of 1.5 is used to account for weighting and tapering in the matched filter. A typical range profile for target classification consists of several hundred range bins of width less than the range resolution. The radar cross section of a target is two dimensional, i.e. it consists of a distribution of point scatterers in range and cross range. Thus, the range profile of the target is the same distribution of point scatterers projected along the line of sight from the radar to the target. As a result, several scatterers forming the target may fall within the same resolution cell producing a strong return, or scintillation effect. Furthermore, the scatterers grouped within one range bin cannot be resolved in range by the matched filter and their scintillation effects can make them unreliable for target classification or characterization.

In addition to ones listed above, other problems unsolved by the prior art exist. Where the target has edges, such as dihedrals, trihedrals, flat planes, cones, cylinders, and other, the target becomes difficult to characterize for classification purposes. These type of targets can be represented by point scatterers at a fixed range that have a radar return amplitude that varies with frequency. Other type of targets (scatterers) may have an absorbing mode that produces an exponential decay with frequency. Small aspect angle variations may produce significant changes in range profile of a target. Because of these complexities, prior art HRR classification methods were relatively unreliable in producing good probabilities of target classification.

I. Feature Extraction

To avoid the limitations of the prior art, the present teaching uses a Modified Forward Backward Linear Prediction (MFBLP) method. MFBLP resolves scatterers in range at high range resolution, a fraction of a range bin width, while also estimating the range and amplitude of the principal target scatterers forming the target.

The MFBLP technique as applied to this teaching is derived from a theoretical background detailed by Tufts, D and Krumaresan, R titled *Frequency Estimation of Multiple Sinusoids Making Linear Prediction like Maximum Likelihood*, Proc IEEE 70, pp 975-990 (1983), incorporated herein by reference in its entirety.

The steps of the MFBLP method comprise an estimation of the number of scatterers representing the target. To perform MFBLP count the eigenvalues of a forward-backward raster matrix consisting of frequency samples that are 10 db above a noise level. The linear prediction model length is taken to be ¾ of the number of frequency phase history samples. The forward-backward approach is used where the target being analyzed shows that no significant scatterers have decaying amplitude characteristics. Conversely, if the target has decaying amplitude characteristics, use the forward aspect only. The forward aspect accommodates decaying or absorbing scattering modes. Linear prediction is used because in this application it can accurately model scatterer amplitude variations with frequency as is the case with flat plates, dihedrals and the like. It can also estimate target decaying modes due to microwave ducting.

The block diagram of the present method as implemented in a typical radar system is shown in FIG. 1.

The features extracted by MFBLP are the range and amplitude of the principal scatterers forming the target, the range profile given by:

$$\left\{\frac{c\tau_k}{2}, z_k\right\}_k$$

where $t_k$ is the estimated 2 way delay from the $k^{th}$ scatterer;
$z_k$ is the amplitude of the $k^{th}$ scatterer.

As shown in FIG. 1, Correlator Matched filter 101 takes the baseband target return $\chi(t_n)$ and computes $$y(\tau_k) = \sum_n x(t_n)\bar{s}_{MF}(t_n - \tau_k)$$

generating $y(t_k)$.

$S_{MF}$ is the matched filter waveform, while
$S_{XTR}$ is the transmitted waveform.

Fourier transform 103 operates on $y(t_k)$ to generate $$Y(f_p) = \sum_{k=-2B_wT}^{k=2B_wT} y(\tau_k)\exp(-2\pi j\tau_k f_p)$$

In turn, Demodulation of XTRM and RCV Waveform 105 computes the following from $Y(f_p)$ $$\tilde{Y}_p \equiv \bar{Y}(f_p) = \frac{Y(f_p)}{S_{XTR}(f_p)\bar{S}_{MF}(f_p)}$$

Superresolution processing 107 receives $\tilde{Y}_p$ and computes $$\tilde{Y}_p = \sum_m z_m \exp(-2\pi j f_p \bar{\tau}_m) + \bar{V}_p$$

It also performs model order selection, Range and Amplitude estimation by MFBLP thus generating:

$\{\bar{\tau}_k, z_k\}_k$

From the results of Superresolution processing 107 the Cramer—Rao bound (CRB) Computation predicted MSE 109 computes a lowest possible variance that an unbiased parameter estimator can attain. It requires a-priori information to generate:

$\{MSE_{r_k}, MSE_{z_k}\}_k$

Since the target scatterer range distribution is unknown at this point in the computation, estimated parameters are computed by MFBLP and used to obtain an estimated CRB. The CRB is used to obtain a measure of robustness on the extracted features. The CRB technique as applied to this teaching is derived from a theoretical background detailed by Rife, D. C. and Booytyn, R. R. titled *Single Tone Parameter Estimation from Discrete time Observations* IEEE Transactions on Information Theory, IT-20, pg 591-598, (1974), incorporated herein by reference in its entirety.

Figure 2:
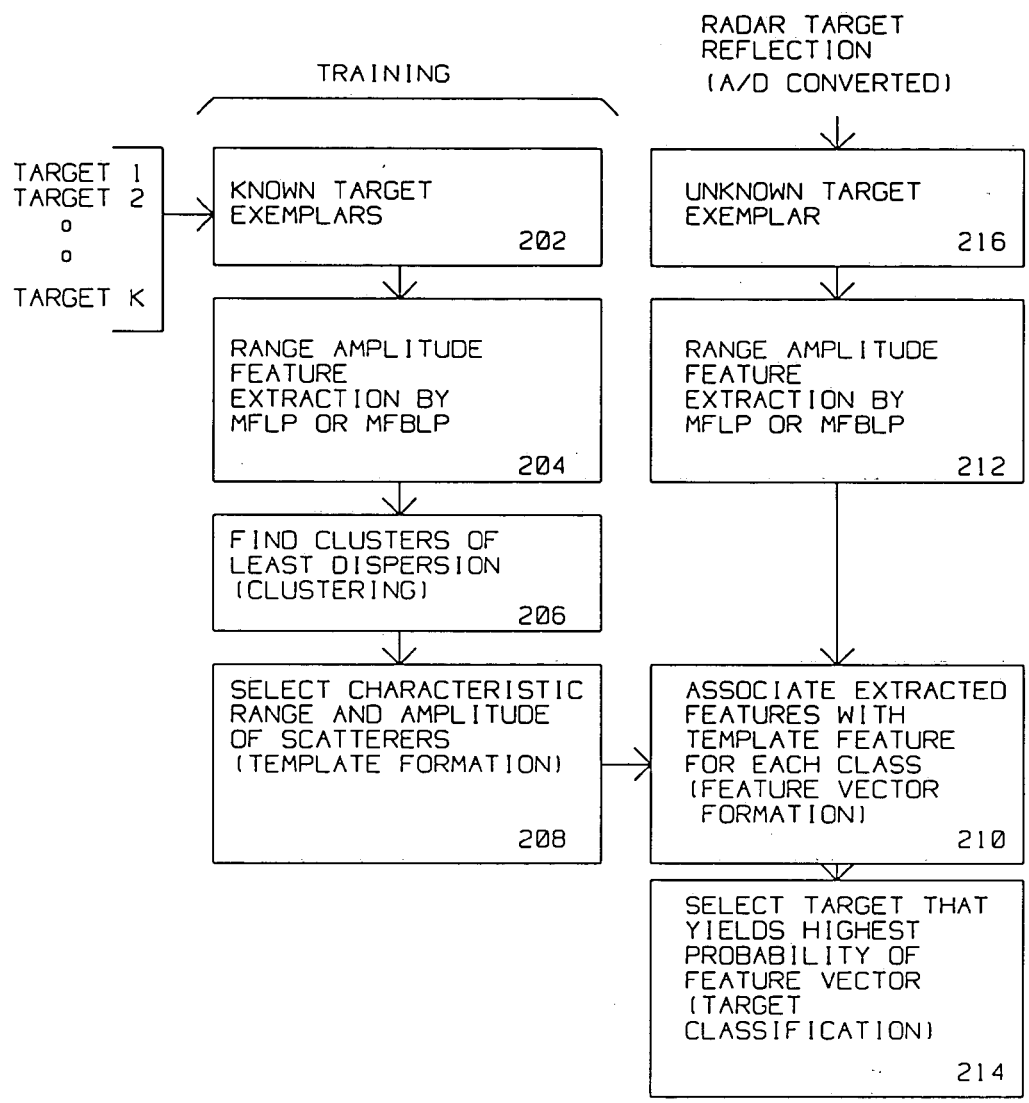
FIG. 2 is a flow diagram of the steps used to acquire known exemplars (target) characteristics and compare them to an unknown target, similarly processed.

FIG. 2 is a flow diagram of the steps used to identify features of both known and unknown targets. Known exemplars (target) features are acquired and stored for future use. The known features, or target characteristics, are compared to features of newly acquired, unknown target(s). Known targets and unknown targets are processed in a similar manner, as shown in FIG. 2. The extracted features of a newly acquired, unknown target are compared to the stored features of known targets to arrive at a target classification.

I. Target Classifier Implementation

The first step in the design of the target classifier is the construction of templates to identify each particular target expected to be encountered. The first step in the disclosed method is to describe the target classifier used in the construction of templates used for identification of each target. A set of exemplars from a given (known) target at slightly offset aspect and depression angles are used to extract range and amplitude of principal scatterers using the MFBLP method.

Next, for a discrete set of range values, within the range extent, form clusters of features by associating a feature point per exemplar according to the highest probability. Each cluster has many features as exemplars. A target template is selected as the mean value of clusters with the least dispersion. This also accounts for the overall length of the target relative to the posing angle (aspect angle) of the target. Usually, in a best mode implementation, the template dimension is small and can be thought as consisting of the target principal scatterers range and amplitude.

Next, obtain feature vectors. Assuming target templates had been previously stored, extract features from an unknown target. Form feature vectors for the unknown target by extracting features from the radar returns, as many as target templates. Associate each range and amplitude feature of the unknown target to be identified with each range and amplitude feature available from a previously stored template. The association of previously stored features with the newly acquired features of the unknown target is performed by maximizing the a-posteriori probability of each extracted feature. A target feature vector formed from the extracted features has the same dimension as the previously stored target template. Each target template has its own probability. The target matching the unknown is the one that maximizes the probability of the extracted feature vector.

Thus, feature extraction is similarly applied to both:

a) known exemplars to build a historical list (or database) of features of known targets for future use in matching to unknown targets (training) and b) unknown exemplars received by the radar in real time to be matched to the list of features previously stored in (a)(classification/identification).

As described in FIG. 2, known target 1 . . . K provides exemplars in Known Target Exemplars 202. These exemplars are used in Known Range Amplitude Feature Extraction by MFLP or MFBLP 204 for feature extraction to build a historical list, or database. In Find Clusters of Least Dispersion 206, the features extracted in 204 are clustered. An examination of the clusters yields a template for a particular known exemplar in Select Characteristic Range and Amplitude of Scatterers 208.

Unknown Target Exemplars 216 acquires Radar Target Return data from the radar in real time. Range Amplitude Feature Extraction By MFLP or MFBLP 212, the same procedure used in 204, extracts range amplitude information from the unknown target radar data, forming candidate feature vectors.

Item 210, Associate Extracted Features with Template Features for Each Class, matches features extracted from the radar data (unknown exemplar) with those previously stored in 208 during template formation. Unknown target classification is computed in Select Target That Yields Highest Probability of Feature Vector 214. Further details of the computations used to implement the classification are given below.

II. Feature Extraction

After waveform demodulation, the baseband return from a target illuminated by a radar waveform is approximated by superposition of sine waves, one for each scattering center. The return waveform is calibrated to the target RCS. Some scattering centers are isolated like the ones resulting from reflection from, for example, a smooth surface/sphere. Other scattering centers are paired, like the case of edges, plates, dihedrals and/or trihedrals. The amplitude of the waves is a function of frequency in general. Because of this frequency dependence, special consideration is given to decaying (frequency) modes or for sinc function type dependence of RCS.

The frequency dependence is modeled by:

$$s_n = \sum_{k=1}^{K} z_k(n\Delta f + f_0) e^{4\pi j \frac{(n\Delta f + f_0)}{c} x_k(\theta)}$$

where K=number of scatterers $x_k(\theta)$=Range of $k^{th}$ scatterer at aspect angle $\theta$ $f_0$=radio frequency $n\Delta f$=$n^{th}$ frequency sample within the radar bandwidth $z_k(n\Delta f+f_0)$=complex amplitude of $k^{th}$ scatterer at frequency $n\Delta f+f_0$ The number of scatterers K is unknown and therefore is estimated (with reasonable accuracy) by the present method. The number of scatterers K is estimated using a forward/backward matrix, defined by $$C_{FB} = \begin{pmatrix} x_1 & x_2 & \cdots & x_{K+1} \\ \vdots & \vdots & \cdots & \vdots \\ x_{N-K} & x_{N-K-1} & \cdots & x_N \\ \overline{x}_{K+1} & \cdots & \overline{x}_2 & \overline{x}_1 \\ \vdots & \cdots & \vdots & \vdots \\ \overline{x}_N & \cdots & \overline{x}_{N-K+1} & \overline{x}_{N-K} \end{pmatrix}$$

where $x_n = s_n + v_n$ and $v_n$ is additive thermal noise.

This matrix is to be used if the target is thought to be devoid of decaying scattering components. If the scattering is deemed to contain decaying or other no-stationary modes, the matrix $C_{FB}$ consists only of the forward data matrix defined by:

$$C_F = \begin{pmatrix} x_1 & x_2 & \cdots & x_{K+1} \\ \vdots & \vdots & \cdots & \vdots \\ x_{K+1} & x_{N-K-1} & \cdots & x_N \end{pmatrix}$$

In the forward backward case, K is selected to be 0.75N, where N=the number of samples in frequency, while in the forward only case use K=0.6N. This maximizes resolvability of closely spaced scatterers in range. The noise power is estimated from the lowest third eigenvalues of $E\{C_{FB}^* C_{FB}\}$. The number of scatterers present is taken to be the number of eigenvalues larger than 12 dB above the noise power.

Next, the MFBLP technique is applied to either the forward-backward data matrix $C_{FB}$ or the forward matrix CF and estimates of the target principal scatterer's range and amplitude $\{r_k, z_k\}$ are obtained. The variance of these estimates can be computed from the CRB by:

$$\sigma_{r_k}^2 = 2\frac{1}{N}\frac{3\sigma^2}{8\pi^2|z_k|^2}\frac{c^2}{BW^2}$$

and $$\sigma_{a_k}^2 = \frac{2\frac{1}{N}\sigma^2}{2}$$

where $a_k=|z_k|$

If necessary, tighter bounds are computed when the scatterers are close to each other. These variance estimators are used to build up the target classifier. Note that the variance of the cluster will be higher because of the aspect angle change of the exemplars.

Classifier Design

1) Template formation, clustering and dispersion.

Assume that the features $\{r_{k,m}, z_{k,m}\}_{km}$ from multiple exemplars have been obtained with MFBLP. The exemplars include different noise realizations and target small aspect angle variations, with an exemplar index m. Now use a clustering method to group similar features from multiple exemplars. Consider the range interval $$\Delta r = [r_s, r_e]$$

where target scatterers appear to lie, and a sampling of $\Delta r$. The separation between samples in $\Delta r$ is taken to be $$\frac{1}{4}\left[1.5\frac{c}{2BW}\right]$$

Take a sample $r_p$ from the sampling of $\Delta r$. Each exemplar has features $r_{k,m_k}$ Associate to $r_p$ the range feature that is closest to it, i.e. feature $r_{k(p),m}$ for example is associated/selected if it is the solution of $$\min_k \{(r_{k,m} - r_p)^2\}$$

This process is repeated for each exemplar (index m). Thus, a cluster of features in range and magnitude (amplitude) is computed by $$C(p) = \bigcup_m \{r_{k(p),m}, a_{k(p)m}\}_m$$

one per exemplar, that associates the feature $\{r_{k(p),m}, a_{k(p),m}\}_m$ with $r_p$.

The clusters C(p) are ranked according to their dispersion from smallest to largest. The dispersion is defined by:

$$\delta(p) = \sum_m \{(r_{k(p),m} - r_p)^2\}$$

The cluster of least dispersion is selected. To ascertain clusters do not contain features in common, the features of the selected cluster are excluded when the whole clustering process is repeated. This selection process identifies the more persistent and reliable target features. The variance of the clusters in range and amplitude are:

$$\sigma_{r_p}^2 = \frac{1}{M}\sum_m (r_{k(p),m} - \bar{r}_p)^2$$

$$\bar{r}_p = \frac{1}{M}\sum_m r_{k(p),m}$$

$$\sigma_{a_p}^2 = \frac{1}{M}\sum_m (a_{k(p),m} - \bar{a}_p)^2$$

$$\bar{a}_p = \frac{1}{M}\sum_m a_{k(p),m}$$

Forming the Target Template

Form a target template by taking the mean of clusters of least dispersion. The selected template is chosen to be indicative of target length and unique structure. Because selected features have the least statistical dispersion, these features tend to represent the target as a whole, thus typically only 10-12 clusters are sufficient to represent the target. This yields a small dimension target template. The template formation procedure is repeated for each target involved in a classification exercise.

Feature Vector Formation

Before feature extraction is implemented, the Radar target return waveform from an unknown exemplar is calibrated to the RCS of the target being classified. When features from an unknown target are extracted, feature vectors are formed, one per unknown target.

The feature vector has the same dimension as the template and its components are obtained by associating an extracted feature $(r_k, a_k)$ to each template feature $R_{i,j}, A_{i,j}$ where k=target feature index, i=template feature index, j=target index.

This is computed by maximizing a posteriori conditional probability density:

$$p(r_k, a_k \mid R_{i,j} + R, A_{i,j}) = \frac{1}{2\pi\sigma_{R_{i,j}}\sigma_{A_{i,j}}}\exp\left(-\frac{1}{2}\left(\frac{(r_k - R_{i,j} - R)^2}{\sigma_{R_{i,j}}^2} + \frac{(a_k - A_{i,j})^2}{\sigma_{A_{i,j}}^2}\right)\right)$$

Or equivalently minimizing over k:

$$-\log(p(r_k, a_k \mid R_{i,j} + r, A_{i,j}))$$

That is, $$\mu(i, j, R) = \min_k \left\{\frac{1}{2}\left(\frac{(r_k - R_{i,j} - R)^2}{\sigma_{R_{i,j}}^2} + \frac{(a_k - A_{i,j})^2}{\sigma_{A_{i,j}}^2}\right)\right\}$$

where $\sigma_{R_{i,j}}$ and $\sigma_{A_{i,j}}$ are the standard deviation in range and amplitude of the cluster i of target j. This yields as a solution:

$$k = k(i,j,R)$$

R is a translation parameter included to handle translation shifts that appear when the targets must be referenced to the same point in range.

Repeat this for each template feature i, obtain {μ(i,j,R)} and sum $$\Lambda(j, R) = \sum_i \mu(i, j, R)$$

For a given target, eliminate the variable R by $$\Lambda(j, \hat{R}_j) = \min_R \{\Lambda, (j, R)\}$$

The solution to above minimization is given by $$\hat{R}_j = \frac{\sum_i \frac{(r_{k(i,j,\hat{R}_j)} - R_{i,j})}{\sigma_{r_{i,j}}^2}}{\sum_i \frac{1}{\sigma_{R_{i,j}}^2}}$$

Target Selection

The target selection is made by minimizing the—log—likelihood with translation correction:

$$\min_j \{\Lambda(j, \hat{R}_j)\}$$

Best Mode

Above method is effective with typical moving target exemplars, for example, an aircraft such as a Lear Jet. In applying the teachings using a Lear Jet, the exemplars were collected for backscatter at aspect angles of 0, 15, 40, 45 and 60 degrees using approximately 100 frequency samples in a bandwidth of 400 to 600 Mhz around 8 to 10 Ghz. Signal to noise ratio in the order of 20 dB was maintained for both template design and classification. Each template consisted of 5 to 10 range and amplitude features characterizing the target aspect angle.

The signal to noise ratio used is defined as $$\frac{RCS_{av}}{\sigma^2}$$

where $$RCS_{av} = \frac{1}{N} \sum_{n=1}^{N} |s_n|^2$$

N is typically chosen from 2500 exemplars, 500 from each target aspect angle.

SUMMARY

Figure 3:
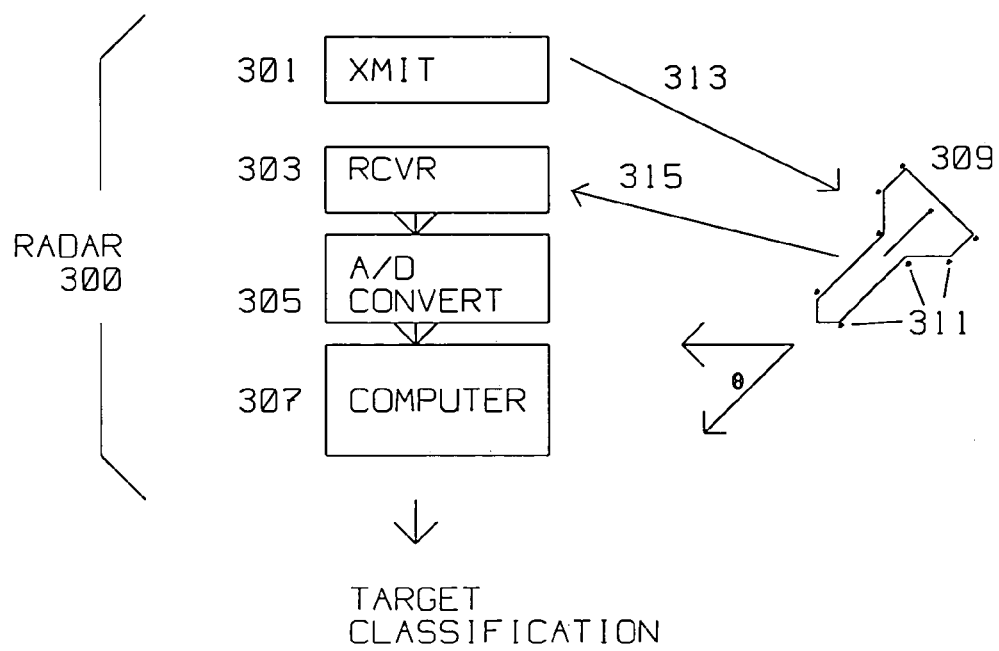
FIG. 3 shows the structure of the present teaching within a radar system.

Shown in FIG. 3 is a radar 300 for classifying an unknown target 309 illuminated with a large bandwidth pulse 313 from transmitter 301. Unknown target 309 reflects the large bandwidth pulse to form a return 315. Return 315 is received by radar 300. Radar 300 comprises an analog to digital converter 305 for converting return 315 received by receiver 303 (part of radar 300) from unknown target 309 into digital samples at range bin intervals.

Computer 307, also comprised within radar 300, performs the following steps:

1) Extracting a plurality of range and amplitude pairs for scatterers 311 descriptive of unknown target 309 from the digital samples. A plurality of unknown range and amplitude features may be within one range bin interval.

2) Extracting principal scatterers from said unknown range and amplitude pairs;

3) Forming an unknown feature vector for said unknown target 309 using unknown range and amplitude pairs associated with said principal scatterers;

4) Retrieving a plurality of known feature vectors, said known feature vectors containing known range and amplitude pairs stored in said computer, said known range and amplitude pairs descriptive of known targets, said known range and amplitude pairs grouped in clusters having least dispersion for each of said known targets.

5) associating for said number of principal scatterers said unknown feature vector descriptive of said unknown target with said plurality of known feature vectors 210; and 6) classifying said unknown target using highest a posteriori conditional probability density obtained from comparing said known feature vectors with said unknown feature vector 214.

The plurality of range and amplitude features 311 descriptive of the unknown target 309 are extracted using a Modified Forward Backward Linear Prediction. The Modified Forward Backward Linear Prediction estimates the range location and amplitude of the scatterers 311 forming unknown target 309.

Unknown scatterers 311 are tested for decaying modes.

Unknown range and amplitude pairs are extracted using a matched filter correlator 101 followed by a Fourier Transform 103 and demodulation of the transmitter and receiver waveform 105. This allows extraction of range amplitude pairs located within one range bin. After the Fourier transform 103, the frequency components of the modulated high bandwidth, transmitted radar signal are canceled in the frequency domain.

The reflected return 315 from target 309 (after down conversion) and its 1 . . . K features 311 is represented by $$s_n = \sum_{k=1}^{K} z_k (n\Delta f + f_0) e^{-4\pi j \frac{(n\Delta f + f_0)}{c} x_k(\theta)}$$

as detailed above.

All references cited in this document are incorporated herein in their entirety by reference. Specifically, *Synthetic Aperture Radar* by John J Kovaly, ISBN 0-89006-056-8, Artech House, and *Radar Technology* by Eli Brookner, ISBN 0 89006 0215, Artech House, are incorporated herein in their entirety by reference to provide a background for this teaching and definition of variables used herein.

Although presented in exemplary fashion employing specific embodiments, the disclosed structures are not intended to be so limited. For example, although radar 300 shows a transmitter 301 and receiver 303 as colocated, and using the same antenna, bistatic operation is also envisioned where transmitter 301 is remotely located from receiver 303.

Those skilled in the art will also appreciate that numerous changes and modifications could be made to the embodiment described herein without departing in any way from the concepts contained in these teachings.

The invention claimed is:

1. A radar for classifying an unknown target illuminated with a large bandwidth pulse, said unknown target reflecting said large bandwidth pulse to form a return, said return received by said radar, said radar comprising:

an analog to digital converter for converting said return received by said radar from said unknown target into digital samples at range bin intervals;

a computer for:

extracting a plurality of unknown range and amplitude pairs descriptive of said unknown target from said digital samples, some of said plurality of unknown range and amplitude pairs within one of said range bin intervals;

extracting principal scatterers from said unknown range and amplitude pairs;

forming an unknown feature vector for said unknown target using unknown range and amplitude pairs associated with said principal scatterers;

retrieving a plurality of known feature vectors, said known feature vectors containing known range and amplitude pairs stored in said computer, said known range and amplitude pairs descriptive of known targets, said known range and amplitude pairs grouped in clusters having least dispersion for each of said known targets;

associating for said number of principal scatterers said unknown feature vector descriptive of said unknown target with said plurality of known feature vectors;

computing a conditional probability density from comparing said known feature vectors with said unknown feature vector; and classifying said unknown target using highest a posteriori conditional probability density obtained from comparing said known feature vectors with said unknown feature vector.

2. A radar as described in claim 1, wherein said principal scatterers descriptive of said unknown target are estimated using a Modified Forward Backward Linear Prediction thereby limiting said number of range amplitude pairs.

3. A radar as described in claim 2 wherein said Modified Forward Backward Linear Prediction estimates range of said principal scatterers forming said unknown target.

4. A radar as described in claim 3 wherein said principal scatterers are tested for decaying modes.

5. A radar as described in claim 4 wherein said Modified Forward Backward Linear Prediction estimates are evaluated using Cramer Rao Bound computation for robustness.

6. A radar as described in claim 5 wherein said unknown range and amplitude pairs are extracted using a matched filter correlator followed by a Fourier Transform and demodulation of the transmitter and receiver waveform.

7. A method for classifying an unknown target illuminated with a large bandwidth pulse from a radar, said unknown target reflecting said large bandwidth pulse to form a return, said return received by said radar, said method comprising the steps of:

converting said return received by said radar from said unknown target into digital samples at range bin intervals;

extracting a plurality of unknown range and amplitude pairs descriptive of said unknown target from said digital samples, some of said plurality of unknown range and amplitude pairs within one of said range bin intervals;

extracting principal scatterers from said unknown range and amplitude pairs;

forming an unknown feature vector for said unknown target using unknown range and amplitude pairs associated with said principal scatterers;

retrieving a plurality of known feature vectors, said known feature vectors containing known range and amplitude pairs stored in said computer, said known range and amplitude pairs descriptive of known targets, said known range and amplitude pairs grouped in clusters having least dispersion for each of said known targets;

associating for said number of principal scatterers said unknown feature vector descriptive of said unknown target with said plurality of known feature vectors;

computing a conditional probability density from comparing said known feature vectors with said unknown feature vector; and classifying said unknown target using highest a posteriori conditional probability density obtained from comparing said known feature vectors with said unknown feature vector.

8. A method as described in claim 7 wherein said principal scatterers descriptive of said unknown target are estimated using a Modified Forward Backward Linear Prediction thereby limiting said number of range amplitude pairs.

9. A method as described in claim 8 wherein said Modified Forward Backward Linear Prediction estimates range of said principal scatterers forming said unknown target.

10. A radar as described in claim 9 wherein said principal scatterers are tested for decaying modes.

11. A method as described in claim 10 wherein said Modified Forward Backward Linear Prediction estimates are evaluated using Cramer Rao Bound computation for robustness.

12. A method as described in claim 11 wherein said unknown range and amplitude pairs are extracted using a matched filter correlator followed by a Fourier Transform and demodulation of the transmitter and receiver waveform.

* * * * *